Figure 1:
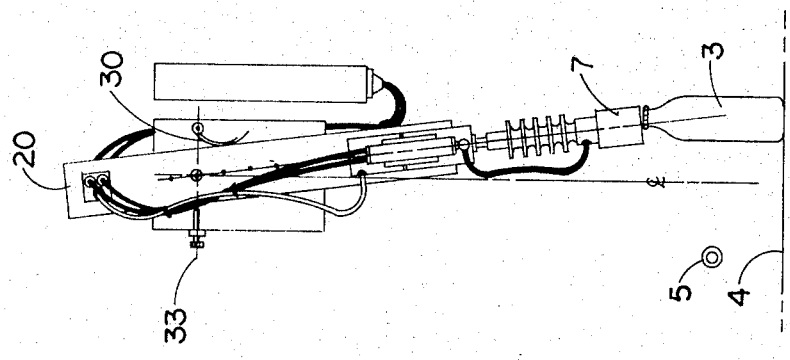

United States Patent [19]
Howe

[11] 3,729,897
[45] May 1, 1973

[54] PENDULUM MOUNTED HEAT SEAL
[75] Inventor: George F. Howe, Poplar Grove, Ill.
[73] Assignee: Champion International Corporation, Hamilton, Ohio
[22] Filed: Aug. 6, 1971
[21] Appl. No.: 169,754

[52] U.S. Cl. ..................................................53/329
[51] Int. Cl. ..............................................B65b 51/14
[58] Field of Search..........................................53/329

[56] References Cited
UNITED STATES PATENTS

| 3,048,954 | 8/1962 | Abel | 53/329 |
| 3,343,336 | 9/1967 | Bradford | 53/329 |

Primary Examiner—Travis S. McGehee
Attorney—Daniel P. Worth

[57] ABSTRACT

A cap is heat sealed over the mouth of a plastic bottle by a heat sealing mechanism which is mounted on a pendulum whereby the bottle is conveyed past the heat sealing device on a conveyor belt and at the same time heat sealing is accomplished. The pendulum mounting permits the heat seal device to follow the bottle. The cap has a plastic lining within a conventional bottle cap. A typical application is the heat sealing of a bottle containing dairy products, uncarbonated, or carbonated beverages where the bottle is made of polyethylene and the bottle cap is made of aluminum lined on the side adjacent the bottle with polyethylene.

10 Claims, 7 Drawing Figures

PENDULUM MOUNTED HEAT SEAL

SUMMARY OF THE INVENTION

This invention relates to a pendulum mounted heat seal. One aspect of the invention is to provide means for heat sealing a supported film of plastic to a bottle having a plastic pouring lip, polyethylene being an example of a useful plastic in each instance. An aspect of the invention is to provide a pendulum type heat seal whereby the bottle can be followed by a heat seal means as it moves along a conveyor belt for a time sufficient to achieve the heat seal. One aspect of the invention is to heat seal supported plastic films such as polyethylene lined aluminum foil bottle caps to the neck or pouring lip of a bottle made of polyethylene and containing milk or a carbonated beverage, in connection with which the invention will be described.

The advent of the all-plastic bottle as a fluid container has brought with it service conditions which require an extremely tight seal at the lip or pouring edge. Some of the service and testing procedures are most rigorous, and even may involve taking an all-plastic bottle and squeezing it as hard as possible to see if the cap can be made to leak. In order to meet the fluid-tight requirements of the trade, it has been suggested to heat seal the cap to the bottle itself. This means, of course, that the heat sealing film and the bottle have to be compatible with each other so that sealing between them takes place. For example, a polyethylene film inside an aluminum bottle cap will heat seal effectively to a polyethylene.

Some prior art heat sealing means are incorporated into a device similar to a capping machine whereby the bottles are moved by an indexing device through a series of stations. At each station one phase of the heat sealing procedure takes place, and at the end of the heat sealing operations the bottle is returned to a conveyor means and carried away to a point where it can be packaged and loaded for transport to the consumer or ultimate outlet.

The present invention dispenses with the need for a dwell period at each station of the indexing device so far as the heat sealing operations are concerned. The present invention does presuppose that bottles can be furnished with their caps already in place and ready to be heat sealed.

The present invention provides a heat seal means mounted on a pendulum. The ability of the pendulum to swing permits the heat seal means to follow the bottle for a distance along the conveyor and for a time sufficient to heat seal the film on the bottle pouring lip. The invention also involves means to return the mechanism to its starting position so that a similar set of operations can be repeated on the next succeeding bottle.

Figure 2:
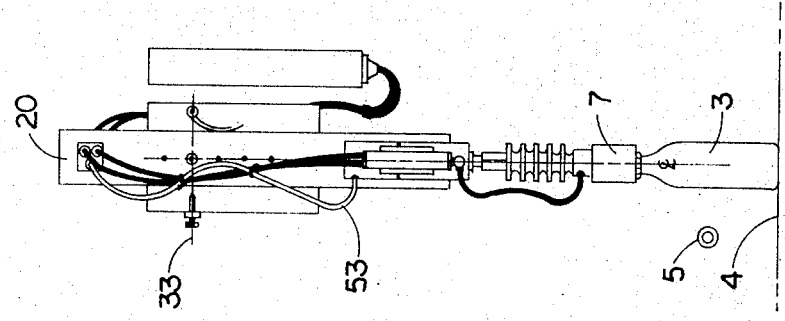
Figure 3:
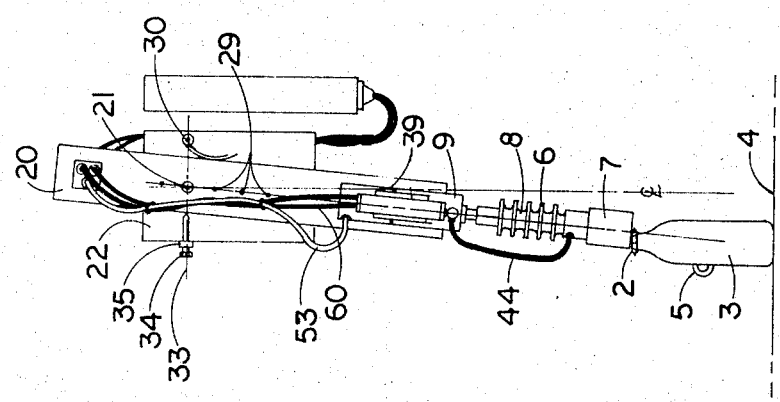
Figure 5:
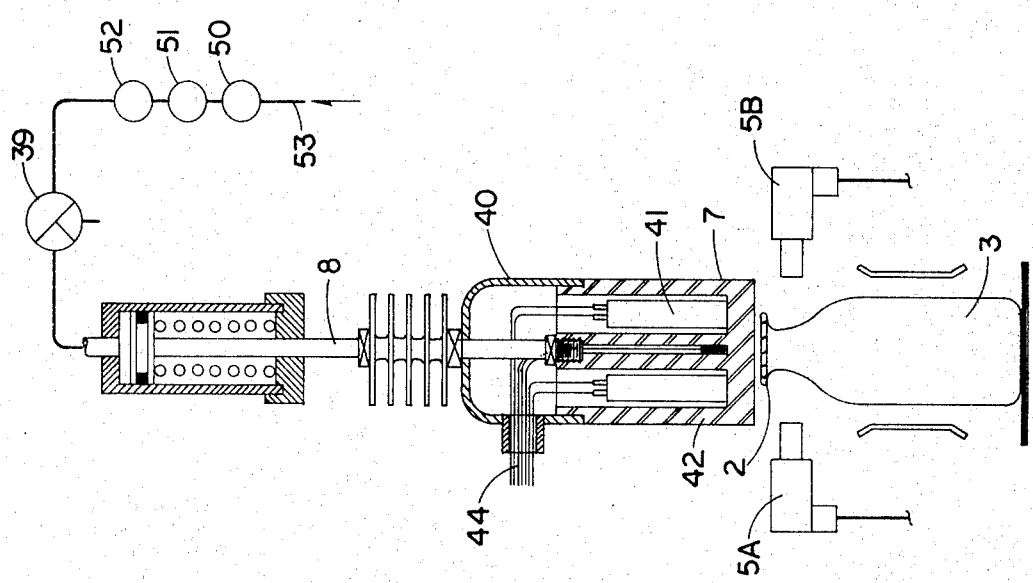
Figure 4:
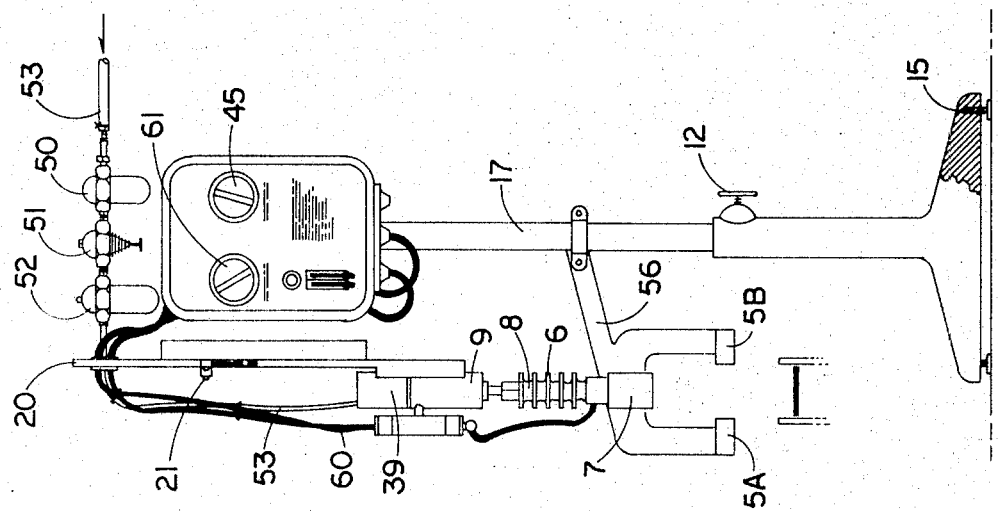
Figure 6:
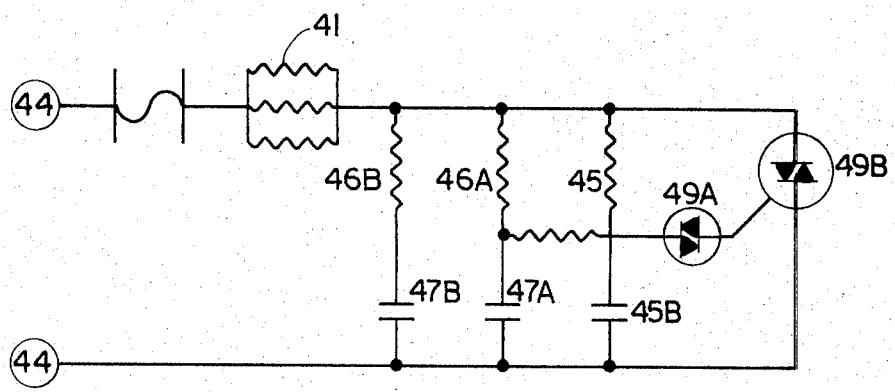
Figure 7:
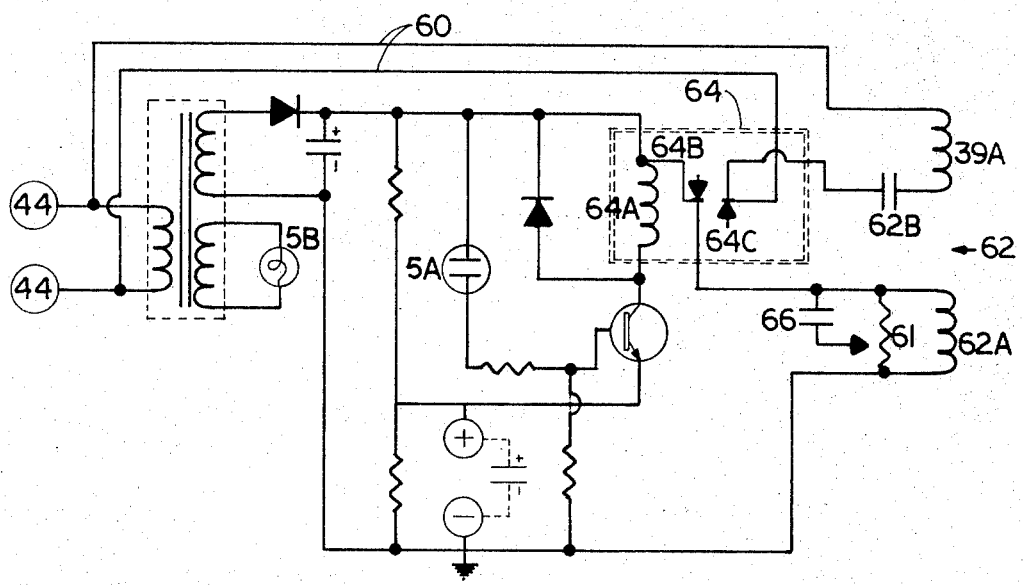

Other objects, advantages and features will be recognized and appreciated from the following disclosure when read in conjunction with the FIGS. and claims wherein:

FIGS. 1, 2, and 3 schematically illustrate a front view of the subject heat seal in a series of positions assumed during a heat sealing operation, respectively, at the beginning, during and at the end of a heat sealing operation;

FIG. 4 is a schematic side view showing the bottle guides, pedestal, and associated equipment;

FIG. 5 schematically illustrates a cross-section of the heat head and the air piping;

FIG. 6 schematically shows the heater and heater control circuit for the heat head;

FIG. 7 schematically shows a suitable timing adjustment and control circuit for use with the apparatus of the other FIGS.;

Referring now to FIGS. 1, 2 and 3 there are shown a sequence of operations using the present pendulum mounted heat seal assembly to heat seal a cap 2 to the neck or pouring lip of a conventional liquid containing bottle 3 while the latter is moved by a conveyor 4 into engagement with the heat seal assembly 1 and thereby is conducted through the heat sealing operation. Preferably as in FIG. 1 the beginning heat seal or heat head position is slightly back, i.e., upstream of the vertical center line of the pendulum: about 2° is desirable.

The bottle 3 is an all-plastic bottle suitable for containing an uncarbonated beverage. Typical is a ⅓ pint bottle made of polyethylene, containing an aqueous artificially flavored beverage (grape, raspberry, orange, etc.) and capped in a conventional manner by a conventional plastic lined aluminum foil cap 2. The polyethylene cap lining is on the inside of the cap and physically contacts the lip of the bottle. In this instance, the cap has a layer of polyethylene coated on a layer of aluminum foil. The bottle may also be polystyrene in which case the polyethylene lined foil cap will also heat seal to it. On some occasions the cap is made of an aluminum foil-wax paper combination that is overcoated with a polyethylene type plastic. The former cap is preferred because of the simplicity of its construction and lower cost.

In any event, as seen in FIGS. 1, 2 and 3 the conventional conveyor belt 4 moves the bottle 3 past the heat sealing assembly 1. As the bottle approaches (FIG. 1) the assembly, and electric eye or some similar sensing mechanism (such as a limit switch or microswitch) 5 senses the presence of the bottle and actuates a control system to trigger a series of events, one of which is to lower the heat head 7 down on to the bottle (FIG. 2). The heat head 7 contains the heat sealing means per se. The heat head is attached to the end of a piston rod 8 of a pneumatic cylinder 9. The piston rod may have cooling fins 6 thereon for heat dissipation. The heat head while engaged with the cap (FIG. 2) applies heat to the cap for a time sufficient to achieve the desired amount of heat sealing. As illustrated in FIG. 3, at the end of such time the heat head is withdrawn by actuating the cylinder in the reverse direction (up) and the system is reset, i.e., returned to the starting position of FIG. 1.

The heat seal assembly 1 is mounted on a standard pedestal 10 (FIG. 4) which provides a manual vertical height adjustment means 12 and can be readily moved. This particular type of pedestal is commonly found in dairies and similar bottling operations. Its use here minimizes the amount of additional equipment to be acquired when the present invention is placed in operation. In addition, it emphasizes the ease with which the present invention can be installed on an existing bottling line merely by positioning it at an operating position on the line and without requiring a lot of intricate mechanical connections and timing between the existing line and the heat sealing device.

The pedestal 10 illustrated in FIG. 4 comprises a base 14 under which are leveling screws 15. A column 17 means extends upwardly from the base. The height adjustment means 12 may comprise a gear and ratchet assembly of conventional sort which drives a movable portion of the column upward out of the base or lower portion of the pedestal or it may be a screw-type clamp that keeps column 17 in place. The heat seal pendulum assembly 1, control box, and other mechanisms are attached to the upper end of the column 17.

The pendulum assembly 1 includes the heat head 7 and air cylinder (i.e., neat head moving means) 9, supported on a pivot plate 20 supported by a bolt 21, acting as an axle or pivot shaft, from a pendulum support member 22 which is in turn secured by bolts 23 – 27, brackets and the like to the upper end of the column. In this way the entire assembly 1 can be made up at a factory, shipped to a dairy, and attached to the pedestal 10 which, as already noted, is a piece of standard equipment around dairies. Of course, other types of support means than the pedestal illustrated can be used.

The pivot plate 20 may have a number of pivot holes 29 whereby different amounts of balance, back and forth swing, etc., can be achieved. Bolted to the support plate is a set of springs 30, illustrated as leaf springs, which biases the pendulum or pivot plate back toward the pivot adjustment 33 which acts as a stop. The pivot adjustment advantageously may comprise a bolt 34 secured in a threaded opening on a bracket or ear 35 which extends from the support plate. The bolt may, if desired, have one or more lock nuts attached thereto. The purpose of the pivot adjustment 33 is to regulate the amount of back swing and to position the pendulum and therefore the heat seal for the initial portion of the stroke.

Also supported on the pendulum assembly on top of cylinder 9 solenoid operated valve 39 for controlling air going into and out of the air cylinder and the heat head 7 on the end of the air cylinder plunger. The heat head 7 (FIG. 5) comprises an insulated upper body 40 surrounding a plurality of heaters 41 arranged within the head, a heat conductive body with a flat cap contacting surface 42 engaging the top of the bottle cap 2 and the electrical leads 44 connecting the heaters to the control circuit of FIG. 6. The entire heat head 7 is attached to the lower end of the air cylinder plunger. The air cylinder may be either single acting (as in FIG. 5) or double acting. As shown in FIG. 5 the air circuit includes the solenoid operated valve 39 with the necessary air piping 53 to control the flow and release of air under pressure to one or both ends of the air cylinder depending on whether it is single or double.

The presence of the bottle 3 between cell 5A and lamp 5B (mounted on bracket 56) triggers the electric circuit shown in FIG. 7, thereby activating the solenoid 39 which opens the valve to admit air into the air cylinder 9 to drive the heat head 7 down on the bottle. The bottle then is moved by the conveyor belt until it reaches the position of FIG. 3 where disengagement of the cap and heat head take place in response to the first to occur of one of two events — either the appearance of another bottle at the electric eye which causes an electrical and mechanical reset of the system or the expiration of the dwell time to which the electrical control circuit of FIG. 7 has been adjusted. The dwell time is the time interval that the heat head is in heat sealing contact with the bottle cap.

The air circuit shown in FIG. 5 for bringing compressed air to the heat head 7 may be connected to any suitable source of compressed air. On the pivot plate are supported a filter 50, pressure regulator 51, an oiler 52 for the air supply whereby dirt and oil can be removed, the pressure regulated to the pressure required by the air cylinder, and a sufficient amount of oil added to the air stream to keep the cylinder in proper operation. Flexible conduits, e.g., rubber or plastic hose 53 connects the filter 50 to an air supply and the oiler 52 to the cylinder. The pneumatic control circuit includes the three-way valve 39 which is operated by the electrical solenoid 39A (FIG. 7) to either admit air to one end of the single acting cylinder, or to release pressure thereon whereupon the return spring of the single acting cylinder will return the piston to its initial position. The three-way valve 39 is provided to regulate the flow of compressed air to the upper end of the cylinder or to exhaust it to the atmosphere thereby releasing pressure on the upper end of the cylinder, in a manner which is well known in the art.

In FIG. 6 is shown the electrical control circuit for selecting and controlling the amount of electricity supplied to the plurality of parallel-connected electric heaters 41 which are part of the heat head 7. The leads 44 supply electricity, preferably 120 V. A.C., to this circuit. The remainder of the circuit is in series with the heaters and includes a control potentiometer 45 for regulating and adjusting the amount of power supplied to the heaters 41 and means for controlling the voltage supplied to the heaters 41 in accordance with the setting of the control potentiometer.

The voltage control means and the control potentiometer comprise a number of series — parallel circuits having semi-conductor control means therein. The voltage control means has a R-C timing network to assist in controlling the voltage applied to the heaters. Connected in series with the control potentiometer is a first capacitor 45B. In addition, connected in parallel with the potentiometer and capacitor are second and third resistors 46A, 46B and second and third capacitors 47A, 47B, respectively in series with each other. A fourth adjustable potentiometer 48 is connected between the control potentiometer and the second resistor. A bi-directional triggered diode semiconductor 49A (such as the Diac sold by General Electric) is connected from a common junction between the first and fourth potentiometers and the gate of transistor 49B which serves as an A.C. semiconductor switch. The collector and emitter of the transistor 49B are connected in series with resistance load 41 to leads 44. A control system of the sort just described may be obtained commercially from General Electric Company as their standard Triac unit, but without the heaters and the control potentiometer which must be added.

In FIG. 7 is shown a timer control circuit for regulating the dwell time, i.e., the time that the heat head 7 is held in engagement with the bottle cap 2 to achieve the requisite heat sealing. This is the time interval between the first instance of heat sealing engagement (at about or shortly after the FIG. 1 position) and the disengagement of the heat head (at about or shortly before the FIG. 3 position). This in effect is a timing circuit which is triggered into operation by receipt of a signal from the lamp 5B at the cadmium cell 5A portion of the electric eye assembly 5 responsive to (FIG. 1) the bottle 3 interrupting the light beam normally transmitted between the lamp 5B and the cell 5A. Upon this occurring, the system functions to complete an electrical circuit through leads 60 to energize solenoid 39A of the control valve 39 and cause air to be admitted to the upper end of the air cylinder of FIG. 5, the piston to move downward, and the heat head 7 to engage the bottle cap 2. This engagement remains until the timing circuit of FIG. 7 breaks the circuit to the solenoid 39A and causes disengagement by exhausting air from the upper end of the air cylinder of FIG. 5.

The electric circuit of FIG. 7 provides a timing circuit which can be set for varying amounts of time depending on the speed that the bottle is moved by the conveyor, the difficulty of heat sealing caused by such factors as the thickness and materials of the bottle cap and the bottle, the amount of materials spilled on the bottle neck during filling which might interfere with heat sealing (this, however, has not been a serious problem), and other factors.

The FIG. 7 timing circuit includes a dwell control potentiometer 61 which is adjusted to provide the desired amount of dwell time. A time delay relay 62 is provided in conjunction with this, including relay coil 62A which operates the contacts 62B to close same during the dwell time, i.e., while the heat head is engaged with the bottle cap. The relay contacts 62B are normally open, are closed responsive to the coil being energized when the bottle appears at the electric eye, and remain closed until the dwell time is exhausted or until the electric eye 5 (which includes the lamp 5B and cell 5A) detects another bottle and provides a signal to reset.

In operation power is supplied from the leads 44 through a power supply transformer. Cadmium cell 5A detects when a bottle breaks the light beam from lamp 5B and thereby completes a circuit through air cylinder control relay 64 by causing the transistor 65 to act like a closed switch, completing the circuit through the coil 64A of the air cylinder control relay. When the last stated even occurs, the relay completes the circuit across normally open contacts 64B and temporarily breaks the circuit through normally closed contacts 64C.

When the relay 64 is actuated, normally closed contacts 64C are opened which prevents the air cylinder solenoid 39A from being immediately actuated because of the break in the circuit at this point. This condition exists until the electric eye light beam is broken by reason of the bottle being moved by the conveyor into the path of the electric eye light beam which de-energizes relay 64, closes contacts 64C to their closed condition whereupon solenoid 39A is energized and the air cylinder 9 operates. The timing circuit for relay 62 includes the potentiometer 61 and the capacitor 65 and prevents relay 62 from changing its position for the dwell time. At the end of the dwell time the timing circuit causes the coil 62A to de-energize whereupon the air cylinder is caused to exhaust.

Should a bottle appear at the electric eye during the dwell time selected by adjustment of potentiometer 61, energizing of relay 64 breaks the circuit through contact 64C thereby causing disengagement of the heat head per FIG. 3 (because air solenoid 39 is thereby de-energized) and mechanical reset of the system under the bias of springs 30, and then a repeat of the aforesaid operations when the second bottle breaks the light beam.

The invention claimed is:

1. A heat sealer for heat sealing a heat sealable closure to a container having an opening surrounded by heat sealable material, the closure being positioned over the container opening before movement by conveying means into engagement with the heat sealer, which heat sealer comprises a heat head,
   a support,
   a pivot plate revolvably mounted on said support for arcuate movement to and fro in a manner substantially like that of a pendulum, and means mounted on said pivot plate on which said heat head is mounted for moving said heat head into and out of contact with such closure.

2. A heat sealer according to claim 1 wherein said pivot plate is mounted on said support to swing in a plane substantially parallel to the plane the closure in place on the container is moved through.

3. A heat sealer according to claim 1 further compring biasing means for resetting said pivot plate by moving said pivot plate when said heat head is out of contact with an object to be sealed to an initial position.

4. A heat sealer according to claim 1 further comprising an adjustable stop member to limit the arcuate movement of said pivot plate.

5. A heat sealer according to claim 1 wherein said means for moving has a reciprocal motion relative to said pivot plate for moving into, maintaining, and moving out of engagement with said closure on said container.

6. A heat sealer according to claim 1 further comprising a conveyor for moving a series of such objects linearly seriatim to a position where each object is initially engaged by said heat head and continued to be so moved by said conveyor with said heat head in contact for a time at least sufficient for heat sealing to occur.

7. A heat sealer that swings pendulum-like through an arc and heat seals an object moved in substantially a line into heating engagement therewith and which for heat sealing objects comprises a heat head,
   a support member,
   a support plate revolvably mounted on said support member, and means mounted on said support plate on which said heat head is mounted for moving said heat head into and out of contact with object to be heat sealed,
   wherein said support plate is mounted to swing in a plane substantially parallel to the plane the object to be sealed is moved through,
   further comprising biasing means for a reset action conducted by moving said heat head when out of contact with an object to an initial position.

8. A heat sealer according to claim 7 further comprising an adjustable stop member to limit the revolvable movement of said support plate.

9. A heat sealer for heat sealing objects comprising a heat head, a support plate revolvably mounted on a support, and means mounted on said support plate on which said heat head is mounted for moving said heat head into and out of contact with object to be heat sealed, wherein said support plate is mounted to swing in a plane substantially parallel to the plane the object to be sealed is moving through, biasing means for a reset action conducted by moving said heat head when out of contact with an object to an initial position, and a conveyor for moving a series of such objects linearly seriatim to a position where each object is initially engaged by said heat head and continued to be so moved by said conveyor with said heat head in contact for a time at least sufficient for heat sealing to occur.

10. A heat sealer according to claim 9 wherein said means for moving is a reciprocable fluid operated motor.

* * * * *